US011200506B2

(12) United States Patent
Wu et al.

(10) Patent No.: US 11,200,506 B2
(45) Date of Patent: Dec. 14, 2021

(54) CHATBOT INTEGRATING DERIVED USER INTENT

(71) Applicant: Microsoft Technology Licensing, LLC, Redmond, WA (US)

(72) Inventors: Xianchao Wu, Tokyo (JP); Kyohei Tomita, Shinagawa-ku (JP); Keizo Fujiwara, Kawasaki (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 515 days.

(21) Appl. No.: 15/844,347

(22) Filed: Dec. 15, 2017

(65) Prior Publication Data
US 2019/0188590 A1 Jun. 20, 2019

(51) Int. Cl.
G06N 7/00 (2006.01)
H04L 12/58 (2006.01)
G06F 40/30 (2020.01)
G06F 16/2457 (2019.01)

(52) U.S. Cl.
CPC ....... G06N 7/005 (2013.01); G06F 16/24575 (2019.01); G06F 40/30 (2020.01); H04L 51/02 (2013.01)

(58) Field of Classification Search
CPC ..................................................... H04L 51/02
See application file for complete search history.

(56) References Cited

U.S. PATENT DOCUMENTS

| 7,861,252 | B2 | 12/2010 | Uszok et al. |
| 8,185,380 | B2 | 5/2012 | Kameyama |
| 8,892,446 | B2 | 11/2014 | Cheyer et al. |
| 8,942,986 | B2 | 1/2015 | Cheyer et al. |
| 9,135,803 | B1 | 9/2015 | Fields et al. |
| 2008/0104037 | A1* | 5/2008 | Bierner ............... G06F 16/3322 |
| 2009/0292528 | A1* | 11/2009 | Kameyama ............. G10L 13/00 704/9 |
| 2017/0300198 | A1* | 10/2017 | Rosenberg ............. G06F 3/011 |

(Continued)

FOREIGN PATENT DOCUMENTS

| CN | 107193978 A | 9/2017 |
| WO | 2017112496 A1 | 6/2017 |

OTHER PUBLICATIONS

"Chatbot for Automotive", Retrieved from <<http://www.reply.com/en/industries/automotive/chatbot-for-automotive>>, Mar. 10, 2017, 3 Pages.

(Continued)

Primary Examiner — Sang H Kim
(74) Attorney, Agent, or Firm — Schwegman Lundberg & Woessner, P.A.

(57) ABSTRACT

A method provides information to a user as a function of derived user intent. The method includes receiving input from a user, generating an intent vector by processing the received input though an artificial intelligence model that has been trained with data representative of the user's intention, wherein the intent vector comprises a probability for each intent in a known set of possible intents, executing a trigger control model to determine whether to respond to the user as a function of the input from the user and the intent vector, utilizing the trigger control model, received input, and intent vector input to generate a response via a trained chatbot, and providing the response via an output device.

19 Claims, 10 Drawing Sheets

(56) References Cited

U.S. PATENT DOCUMENTS

| | | | |
|---|---|---|---|
| 2017/0310613 A1 | 10/2017 | Lalji et al. | |
| 2018/0025726 A1* | 1/2018 | Gatti de Bayser | G10L 15/22 |
| | | | 704/257 |
| 2018/0075847 A1* | 3/2018 | Lee | G06F 16/3329 |
| 2018/0131645 A1* | 5/2018 | Magliozzi | G06F 40/30 |
| 2018/0183735 A1* | 6/2018 | Naydonov | H04L 67/22 |
| 2019/0050731 A1* | 2/2019 | Lu | G06F 16/353 |
| 2019/0140986 A1* | 5/2019 | Anderson | H04L 67/104 |
| 2019/0156198 A1* | 5/2019 | Mars | G06N 3/084 |
| 2021/0097110 A1* | 4/2021 | Asthana | H04L 51/02 |

OTHER PUBLICATIONS

"International Search Report and Written Opinion Issued in PCT Application No. PCT/US18/064147", dated Apr. 16, 2019, 11 Pages.

* cited by examiner

CHATBOT INTEGRATING DERIVED USER INTENT

BACKGROUND

Chatbots are programmed machine that can conduct a conversation via auditory or textual means with a user. Many times, chatbots may be implemented as a specifically programmed machine using various trained artificial intelligence (AI) networks. Some chatbots may be used in customer service and support applications and for information retrieval from a database or via a search engine.

Many chatbots are very fact based, and associate words provided by the user with information from one or more databases in generating a response. Responses generated in this manner may miss elements of communication that are not fact based, resulting in responses that may not be relevant to what a user actually needs.

SUMMARY

A method provides information to a user as a function of derived user intent. The method includes receiving input from a user, generating an intent vector by processing the received input though an artificial intelligence model that has been trained with data representative of the user's intention, wherein the intent vector comprises a probability for each intent in a known set of possible intents, executing a trigger control model to determine whether to respond to the user as a function of the input from the user and the intent vector, utilizing the trigger control model, received input, and intent vector input to generate a response via a trained chatbot, and providing the response via an output device.

A system includes a processor and a memory, the memory comprising instructions, which when executed by the processor, cause the processor to perform operations for providing information to a user as a function of derived user intent. The operations include receiving input from a user, generating an intent vector by processing the received input though an artificial intelligence model that has been trained with data representative of the user's intention, wherein the intent vector comprises a probability for each intent in a known set of possible intents, executing a trigger control model to determine whether to respond to the user as a function of the input from the user and the intent vector, utilizing the trigger control model, received input, and intent vector input to generate a response via a trained chatbot, and providing the response via an output device.

A machine readable medium has instructions, which when executed by a processor, cause the processor to perform operations for providing information to a user as a function of derived user intent. The operations include receiving input from a user, generating an intent vector by processing the received input though an artificial intelligence model that has been trained with data representative of the user's intention, wherein the intent vector comprises a probability for each intent in a known set of possible intents, executing a trigger control model to determine whether to respond to the user as a function of the input from the user and the intent vector, executing a trained chatbot responsive to the trigger control model, received input, and intent vector to generate a response, and providing the response via an output device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
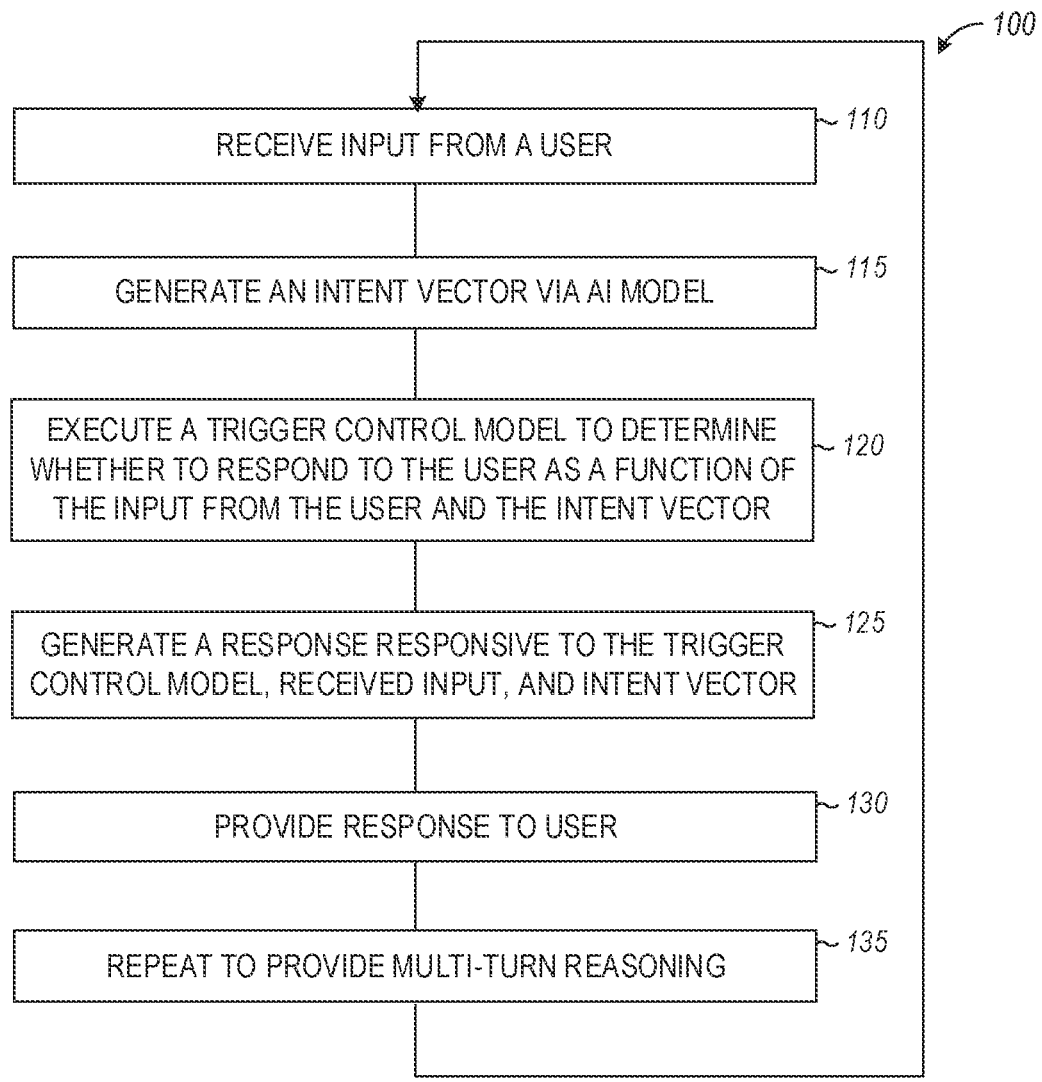
FIG. 1 is a flowchart illustrating a method of providing information to a user via a chatbot as a function of derived user intent according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A chatbot is a machine that can conduct a conversation via auditory or textual means. Many times, chatbots may be implemented as a specifically programmed machine using various trained artificial intelligence (AI) networks. Some chatbots may be used in customer service and support applications and for information retrieval from a database or via a search engine. Such AI networks are commonly very fact based, and use words from a user to generate a response. However, such networks generally ignore an emotional state of a user in generating responses, and are not well suited to a vehicle environment in which more than one user may be present. Thus, chatbots generally do not perform well as a participant among multiple users in a conversation.

In various embodiments, a chatbot may be integrated into automobiles. The chatbot may be configured to assist multiple drivers' and passengers' needs. The chatbot may be configured to understand users' intentions, such as function-oriented, emotion-oriented or even car-control related intentions. The chatbot may determine when and how to reply to user's specific queries based on user profile and current (group/individual) chatting session log. A multi-turn reasoning based generation model may be used by the chatbot for improving the recall of the user's general queries.

In the following description, integration of the chatbot with existing automobiles is shown through describing dataflow in automobiles, dataflow in chatbot servers, and control flow in chatbot servers.

FIG. 1 illustrates a method 100 of providing information to a user via a chatbot as a function of derived user intent. Further detail of the operations performed in method 100 are provided following the description of FIG. 1.

Method 100 includes receiving input from a user as indicated at 110. The input may be provided to multiple application programming interfaces to receive text, speech via microphone, and images via a camera for example, and convert such input into a machine-readable input. In car sensors may also generate input, such as data representative of acceleration, deceleration, gear changes, temperature, tire pressure, mileage, etc. GPS (global positioning sensor) data may also be received as input. The conversion of some forms of the input may be performed by a chat worker, sound worker, or image worker. For example, user speech captured by a microphone may be converted to a textual representation. Analog to digital converters may also be used for some of the sensed data if not already in digital form. One or more of the workers may be AI machines trained for the particular type of input received.

The input may be processed by operation 115 to generate an intent vector. The intent vector may comprise one or more of function oriented intentions of the user, emotion oriented intentions of the user, and car-control oriented intentions of the user. In one embodiment, the input is processed by an artificial intelligence model that has been trained with data representative of the user's intention, wherein the intent vector comprises a probability for each intent in a known set of possible intents.

Operations 120 may include executing a trigger control model to determine whether to respond to the user as a function of the input from the user and the intent vector.

At operations 125, the chatbot may be executed responsive to the trigger control model, received input, and intent vector to generate a response.

The response may be provided via operations 130 using an output device, such as a speaker, display, or other user perceivable means. For example, the output may be a chatbot response in the form of a human intelligible phrase, sentence, concept, or idea in textual or vocal form. The chatbot may also generate the response as a function of the received sensor input data. Providing the response may include queuing multiple responses in an output queue and using the trigger control model to determine which response in the queue to provide via the output device. In further embodiments, the response may relate to control of an autonomous vehicle, such as updating a destination of the vehicle or otherwise changing behavior of the vehicle such as speed, driving style etc.

Operations 135 serve to repeat the operations of method 100 to perform multi-turn reasoning via the chatbot, wherein a first provided response is a bot query of the user, and a subsequent input from the user is a response to the bot query. One example facilitated by method 100 may include the following conversation between the chatbot and the user, with operation 135 serving to facilitate the user and the chatbot, named Rinna in this example, taking turns in the conversation:

User: "Anything interesting?"
Rinna: "News or Rinna's joke" (chatbot's confirmation of general requirement query.)
User: "News"
Rinna: "Got that"
Rinna: starts news feed. The chatbot may actually "read" the news from a news feed, or simply cause a news feed from a selected source to play on a radio of the car.

Input from a user may include input from multiple users, and may also include user profile data, including a gender of one or more users. In the case of multiple users, operation 125 may include correlating each response with each user, queuing multiple responses in an output queue, and using the trigger control model to determine which response in the queue to provide via the output device as a function of priority of the user corresponding to each queued response.

The trigger control model may be a logistic regression model that generates a probability that a response should be triggered, compares the probability to a probability threshold, and triggers the response as a function of the comparison of the probability to the probability threshold. The trigger control model generates the probability that a response should be triggered as a function of user input by multiple users and an engagement rate of the multiple users.

Figure 2:
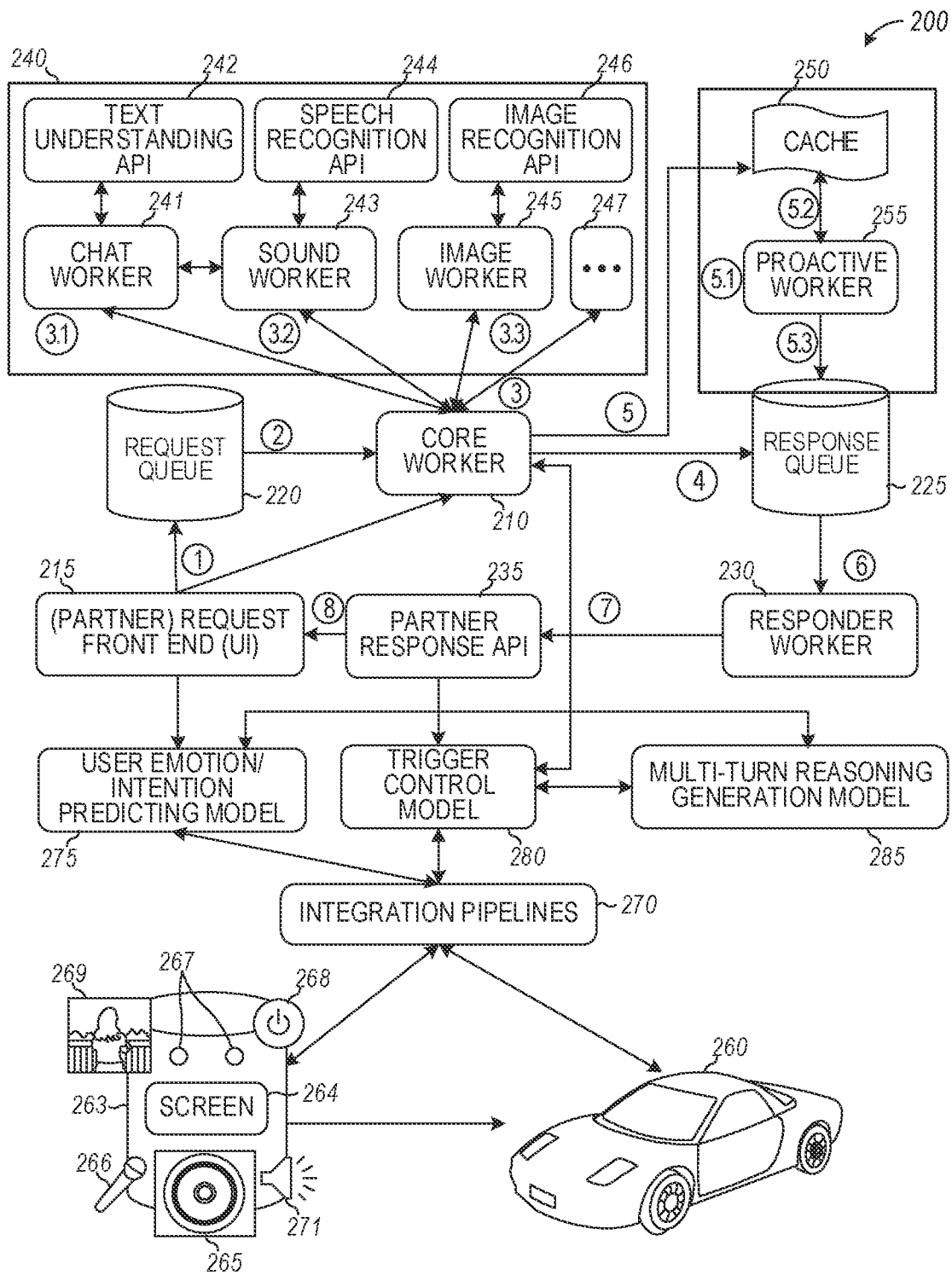
FIG. 2 is a block flow diagram illustrating a framework of an emotional AI chat system according to an example embodiment.

FIG. 2 is a block flow diagram illustrating a framework of an emotional AI chat system 200, also referred to as a chatbot. The framework includes arrows illustrating the data flow annotated with circled numbers indicative of an example order of data flow. A core worker 210 receives input from a user input (UI) front end 215. The input may include user input, such as voice or text, which is queued at a request queue 220 before the input is provided as a request to the core worker 210. The core worker 210 may take requests from the queue 220 in a first in, first out manner in the case of a single user, such as a driver or pilot, or may prioritize requests from different users in a vehicle, giving highest priority to a driver user, and may also take a time sensitive nature of the request into account in deciding which request to take from the request queue 220. Information from a GPS sensor, gas sensor, distance from another car sensor, and other vehicle related sensors may be used to determine priority for requests.

The core worker 210 processes the requests and generates responses. The core worker 210 in the car may be a client that interfaces with remote AI networks to generate the responses, or may include one or more AI networks to generate responses locally in various embodiments. The responses may be queued in a response queue 225.

A responder worker 230 may be used to obtain responses from the response queue 225 and optionally provide responses to a partner response API 235, which utilizes the UI 215 to provide responses to the user or users.

Various colleagues indicated at 240 may be used by the core worker 210 to process input data. The colleagues 240 in one embodiment comprise pairs of workers and APIs. A chat worker 241 and text or language understanding APIs 242 provide text based services. A sound worker 243 and corresponding speech recognition API 244 provide speech recognition, and an image worker 245 and image recognition API 246 provide image recognition services. Other worker/API colleagues are represented at 247.

In one embodiment, the core worker 210 will one-by-one ask its colleagues about whether/how to respond one determined request. For example, the (text) chat worker 241 responds to text-style requests. The chat worker 241 further calls language understanding APIs 242 based on the chat context information. Furthermore, the text chat worker 241 can be split into a number of detailed service support workers, such as time service (for request such as "please calm me at six o'clock for the HR meeting"), weather service (for request such as "will it be running tomorrow?/do I need to bring my umbrella tomorrow flying to Beijing"), and so on.

Sounds are recognized and decoded as texts. Speech recognition API 244 performs a speech-to-text conversion task. Furthermore, after the text sentences are decoded from sounds, sound worker 243 will ask help from text chat worker 241 for language understanding, request analysis and response generation. After the response text being generated by the text chat worker 241 is returned to sound worker 243, the sound worker 243 will perform the text-to-speech function and generate sounds to be listened to by the user.

Like sounds, images are provided to the image recognition API 246 to "read" and "understand" the images. That is, the images need to be decoded into text. For example, when seeing a dog image from the user, system 200 can possibly tell the type/color of the dog and further gives a number of comments/suggestions, such as "So cute, German shepherd! You must love it very much.". Since an image-to-text model can be trained/used directly, the access to text chat worker 241 is optional for image recognition.

System 200 allows anytime plug-in workers 247 besides the described workers. Such plug-in workers make the framework/system 200 flexible and extensible. For example, a location-based worker can easily support location-based services such as "order pizza to my office", "send me a message when I am near a supermarket when I am about to reach my home".

Responses generated by the core worker 210 are transferred to the response queue 225 or into a cache 250. Cache 250 may be used to make sure that a sequence of AI chat responses can be shown to the user in a pre-defined time stream. That is, for one user's one request, if there are no less than two responses generated by the core worker, then a time-delay setting for the responses is helpful in to provide the responses with suitable delays between them for easier utilization by the user.

For example, if the user says "りんな、朝ごはん食べたの？" (Rinna, did you eat your breakfast?), and the AI chat system generates two responses, the first is "食べたよ、食パンを" (yes, I ate bread) and the second is "あなたは？まだペコペコでしょう？" (How about you? Still feeling hungry?). The first message is to be shown to the user immediately. Also, for the second message, an example time delay may be set to two seconds, so that the second message will been shown/audibilized to the user two seconds after showing of the first message. The cache manages these to-be-sent response messages, together with users' identities and the time delay of each response message.

In one embodiment, the system 200 may be integrated into a vehicle 260 such as a car, and include a chatbot user interface/hardware device 263 for capturing user inputs and providing responses as text via display screen 264 or speech via speaker 265. The display screen or screens are touchable and can be operated alike a smartphone's screen. In other examples, this design may enable the chatbot device 263 to be placed in public places, such as in art galleries or museums, such as at the entrance to guide users "where to go", or placed at famous products/paintings to interactively communicate with users who are nearby.

Device 263 illustrates the chatbot hardware design in block form, which is an intelligent voice box plus screen style user interface. "+" and "−" controls may be included for volume control. The device 263 may include computing resources sufficient for executing the system 200. A microphone 266 is also shown for capturing user speech. One or more cameras 267 may be used to capture images, including video images. A power control 268 may be used to turn power on and off to the chatbot device 263. A logo may also be included as indicated at 269, a button for listening to voice based knowledge may be provide as indicated at 271.

One or more integration pipelines 270 may link physical components of the system 200, such as hardware, to the vehicle 260.

One embodiment includes two machine learning models, a user intention predicting model 275 and a trigger control model 280. In addition, a deep learning of multi-turn reasoning-based response generation model 285 is also shown. The generation model 285 may be first controlled by the trigger control model 280 which decides whether or not the generation model 285 should be invoked. The generation model 285 receives the user's intention model 275 output as input for rich response generation.

Figure 3:
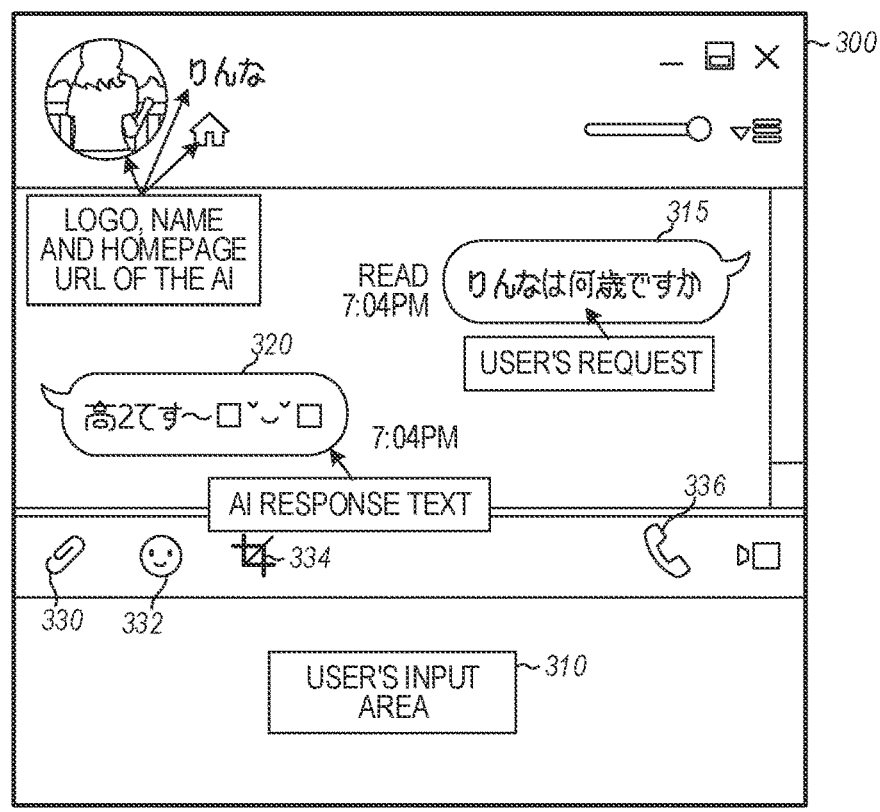
FIG. 3 is a representation of an example screen shot of a chatbot user interface according to an example embodiment.

FIG. 3 is a representation of an example screen shot 300 of the user interface 263 screen 264. The response worker 230 selects an optimal response from the response queue, and then (optionally) calls the partner response API 235. The response is then provided to the user via as can be seen in the screen shot 300.

In one example, the request of "Rinna, how old are you", may be entered in a user input area 310 via typing or voice, and appear in a user request area 315. The response may be "second year of primary high school" (which is around 17 years old) which may appear in a response area 320 of the display. In further embodiments, both the request and response may appear in a single display area and be scrollable, allowing the user to scroll through a conversation that may have multiple requests and responses from one or more users and the chatbot.

Other navigational and functional constructs may appear on the screen 300, including a logo, name of the chatbot, and address, such as a uniform resource locator (URL) of the AI. Other constructs are shown as icons, providing access to attachment functions at 330, emotion based icons 332, cropping function 334, telephone functions 336, and other standard window control functions.

Figure 4:
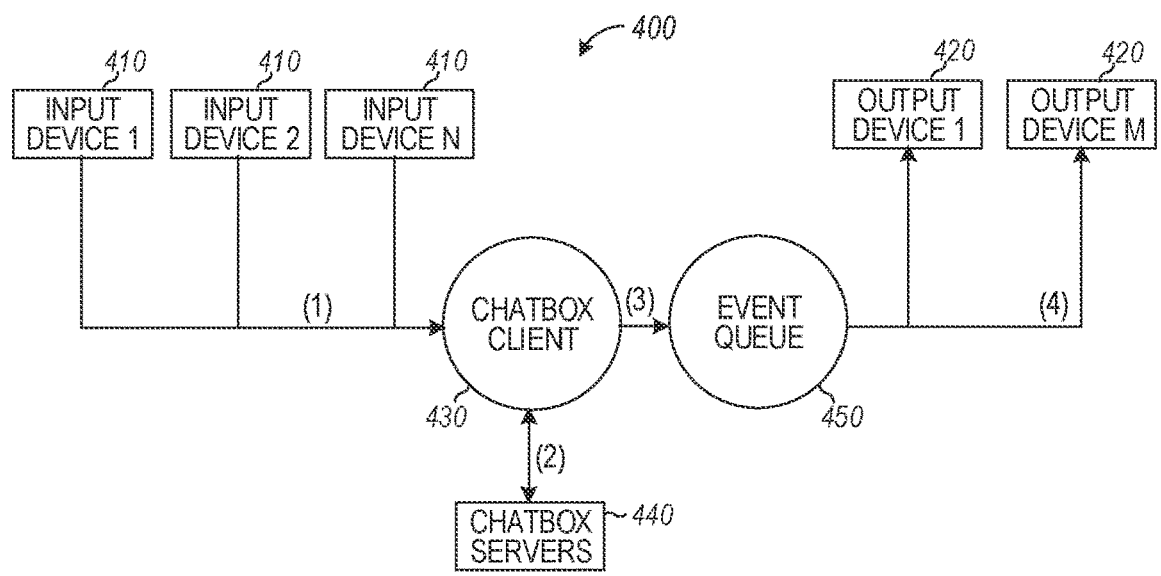
FIG. 4 is a dataflow diagram provided by an integration pipeline according to an example embodiment.

FIG. 4 is a dataflow diagram provided by an integration pipeline 400. Signals on the pipeline 400 may include data collected by input devices 410 equipped in a vehicle. Events may include actions happening in vehicles via output devices 420.

Input/output devices are equipped in automobiles to interact user input and car environments. They are used for both input and output purpose. Any input/output devices can be integrated by pipeline 400. Example input devices 410 include microphones, cameras, GPS units, and in car sensors. Example output devices 420 include speakers, LED lights, and displays. These devices enable collection of information about vehicles such as automobiles, including voice spoken by users, how many people are in an automobile, latitude and longitude, speed of an automobile, and other information.

Pipeline 400 may be used to connect the components of system 200, such as chatbot clients 430 in automobiles and chatbot servers 440. One example bus that may be used to implement pipeline 400 includes a controller area network bus (CAN bus), which is a robust vehicle bus standard designed to allow devices to communicate with each other in applications without a host. The chatbot clients 430 in automobiles are responsible for interaction with users and automobiles. In other words, they are responsible for collecting signals from users/automobiles, and for triggering events in automobiles. The chatbot servers 440 receive signals from the chatbot clients, and decide what events should be happen in automobiles.

In one embodiment, chatbot clients may reside on a vehicle side as an intelligent voice box, or even a headmount device, such as Hololens, or Google glass?

The dataflow in automobiles as shown at pipeline 400, begins with the chatbot client 430 collecting signals in an automobile using input devices 410. The chatbot client 430 sends the signals to the chatbot servers 440 and waits a response. If the response contains an event, the chatbot client put these events to an event queue 450. If output devices 420 are being used to output previous events, events stay in the event queue 450. When the output devices 420 are available to output a next event, the event is removed from the event queue and triggered using the output device.

Figure 5:
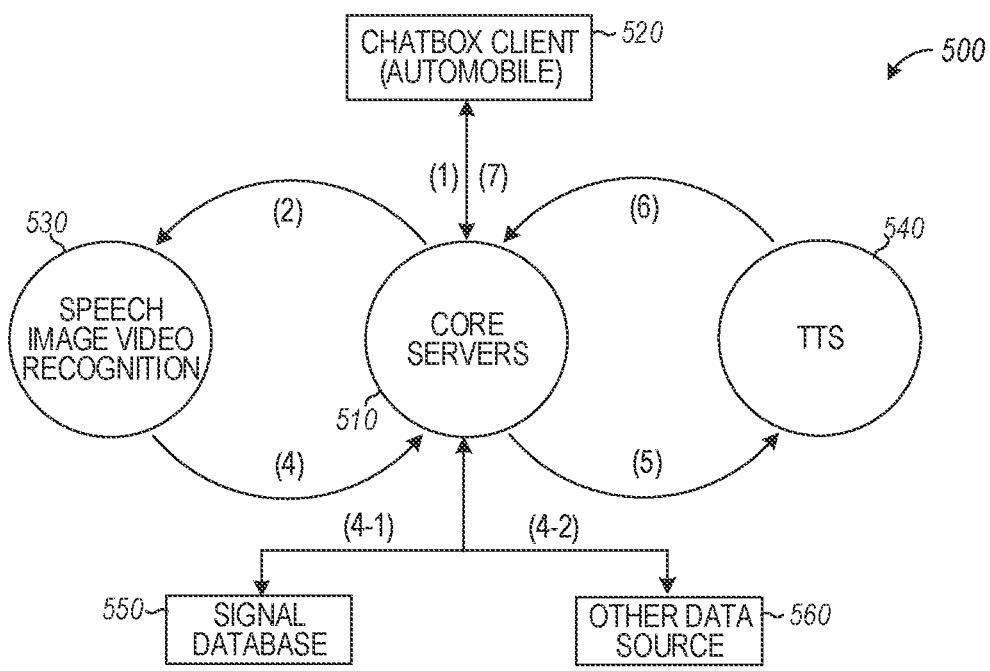
FIG. 5 is a block flow diagram illustrating data flow in chatbot servers according to an example embodiment.

FIG. 5 is a block flow diagram illustrating data flow in chatbot servers generally at 500. Responsive to user speech received by a microphone, the chatbot client 520 sends the voice data to servers (e.g., 510), and receives the event to play an audio file which may contain speech corresponding to the response. If the speaker is not in use with previous events, the audio is played with the speaker in the automobile. A chatbot server 510 is shown coupled to receive signals from one or more chatbot clients 520. In one embodiment, chatbot clients 520 are located in vehicles, such as automobiles, and are in communication with one or more servers located remotely, such as in cloud based computing resources, such as servers 510, 530, and 540. Speech, image, and video recognition servers are shown at 530 with text to speech (TTS) servers indicated at 540. A signal database 550 may include data from one or more sensors, such as a GPS sensor, and a further data source 560, such as weather data and other data, are also communicatively coupled to the server 510.

Chatbot server 510 should be able to interpret signals from chatbot clients 520. The chatbot server 510 decides what kinds of events should be triggered in vehicles based on signals and other data sources.

Figure 6:
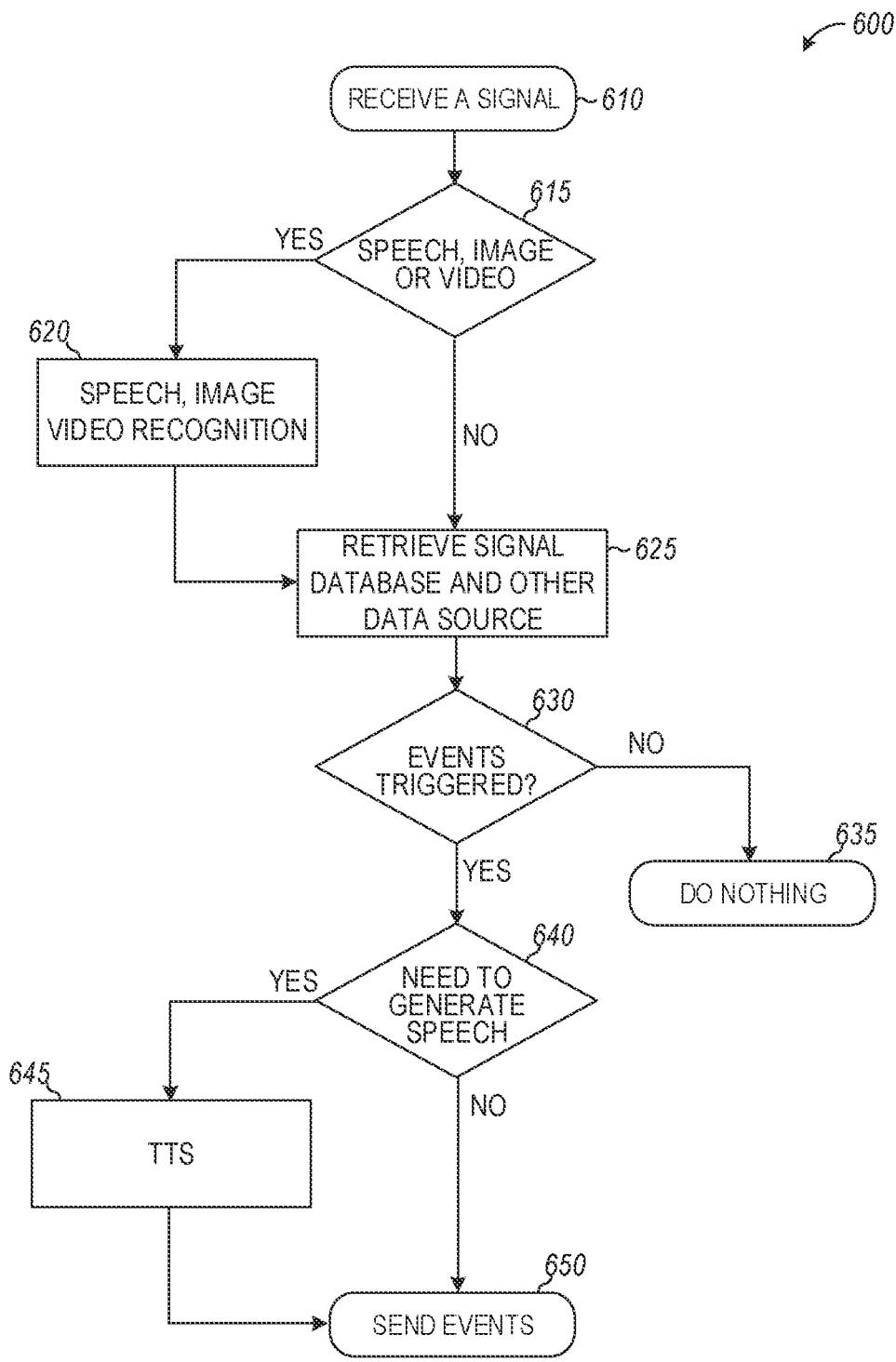
FIG. 6 is a flowchart illustrating operations for performing control flow in chatbot servers according to an example embodiment.

FIG. 6 is a flowchart illustrating operations for performing control flow 600 in chatbot servers in an example embodiment. The chatbot servers (described as core servers) receive signals from chatbot clients on automobiles at operation 610. If signals contain voice, image, or video which need to be converted into another format, core servers, via decision operation 615, send these data to speech/image/video recognition server operations 620. For instance, voice data are to be converted into text to be processed in the following operations. Thus the voice data is sent to speech recognition servers, and core servers gets speech recognition results as text format at operation 625.

Core servers then decide at operation 630 if some events will be triggered on automobiles. The core servers may use past signal data stored in a database, and use other data sources such as the weather of the outside or the surrounding restaurants information. If no event should be triggered in automobiles, the core servers stop processing signals at this point and do nothing as indicated at 635. If events are to play voice in automobiles as determined by operation 640, an audio file is generated from text in Text-to-Speech (TTS) servers at operation 645. Finally, the core servers send generated events to chatbot clients at operation 650.

The user intention prediction model 275, in an example embodiment, separates user's intentions into three different categories, function-oriented intentions, emotion-oriented intentions, and car-oriented intentions.

An example of function-oriented intentions includes news recommendation from the chatbot. Emotion-oriented intentions, such as happy, sad, moods for different types of conversations, and other types of emotions. The chatbot may provide responses during a driving period by joke talking, pure chatting, news, lectures, pod cases, and playing music. The content of such responses may be selected as a function of the detected emotion intentions of the user. Car-oriented intentions may include vehicle control through voice (open/close the car's specific window, open/close the entertainment system, fine-grained tuning of the seating position of the specific seat, and so on).

In order to detect user's intentions quickly, a support vector machine (SVM) model, such as a Stochastic Gradient Descent (SGD) algorithm, may be trained making use of rich features, from the user profile, the conversation session of a current group chat inside the vehicle, that one or more users can be involved in a conversation. Taking a user's current query and current conversation session as the input, the output of the user intention prediction model 275 predicts the probabilities of all the possible intentions. An intention set may be pre-defined before the conversation or can be collected automatically from hand-made/automatically-collected training data. Specially, the following features may be used for training the SVM model:

User profile model's output (gender, age, and active places) in particular, the active places may be frequently visited places that may used to supply location-based services, such as restaurant retrieving, target location navigation, weather information forecasting and so on;

User's historical emotion tendencies to the specific topics that appears in current query and current conversation session. Specially, use is made of a positive/negative sentiment analysis model to automatically predict user's current emotional opinions of the topics. For example, "I like raining days, it makes me think deep about something of my past", then the user's opinion about "raining days" is positive and some deep thinking related relaxing music can be recommended to the user during his/her driving.

Word ngrams: unigrams and bigrams for words in the query. An n-gram is a contiguous sequence of n items from a given sequence of text or speech. The items can be phonemes, syllables, letters, words or base pairs in different embodiments.

Character ngrams: For each word in the query, character ngrams are extracted. 4-grams and 5-grams are used in one embodiment.

Word skip-grams: For all the trigrams and 4-grams in the query, one of the words is replaced by * to indicate the presence of non-contiguous words.

Brown cluster ngrams: Brown clusters may be used to represent words (in query), and extract unigrams and bigrams as features.

Brown cluster ngrams are a construct used to group features together based on a distance of meaning between the features.

Part-of-speech (POS) tags: The presence or absence of part-of-speech tags are used as binary features.

Social network related words: number (in query) of hashtags, emoticons (emojis), elongated words, and punctuations are used as features. Specially, when the user is sending queries through voice, then this part is not active. Otherwise, when the user is communicating with the chatbot through a touchable screen, then the hashtags or any related emotional symbols (other than natural language words) will be taken into account for "user's intention prediction".

Word2vec cluster ngrams: A word2vec tool (Mikolov et al., 2013) is used in one embodiment to learn 100-dimensional word embedding from a social network dataset. A K-means algorithm and L2 distance of word vectors analysis may be used to cluster the million-level vocabulary into 200 classes. The classes represent generalized words in the query.

The trigger control model 280 is used to determine when and how to respond to user queries, especially when there is more than one person (user) in a vehicle such as a car. The chatbot should not talk too much since talking too much will likely interrupt a fluent conversations between the multiple users which will makes the users feeling annoyed or angry. The chatbot determines an appropriate time to respond/talk to satisfy a user's current intention in a relatively good way (in which a pure chat will be not necessary). That is, when the user asks function-oriented queries, then the chatbot should make a confirmation that she understands the user and then make a consequent response.

In one embodiment, a logistic regression model is trained that makes use of rich features for this "trigger control model" which takes a user's current query, the conversation session, the number of users and the engagement rate of the users as inputs and features. The output of the logistic regression model is a probability p that whether the chatbot should be triggered or not. When p is larger than a threshold (such as 0.7), the chatbot provides the response to the user's query. Otherwise, the chatbot will keep in silence (without interrupting the conversation among the users). The features used in our logistic regression model implementing the trigger control model 280 may include one or more of:

The output from user intention prediction model is a list of alike pairs <intention, probability>. Since there can be numerous intentions, a probability is assigned to each intention. The top-N (such as N=3) intentions will be sent to the trigger control model 280.

The engagement rate of other users that are involved in current user's query's topic. The engagement rate may be determined by whether other users mentioned the same topic or its synset (group of data elements that are considered semantically equivalent for purposes of information retrieval) word in the former three turns in current conversation session.

User profile model's output (gender, age, and active places) specially, the active places are used to supply location-based services, such as restaurant retrieving, target location navigation, weather information forecasting and so on.

User's historical emotion tendencies to the specific topics that appears in current query and current conversation session. Specially, a positive/negative sentiment analysis model is used to automatically predict a user's current emotional opinions of the topics. (for example, "I like raining days, it makes me think deep about something of my past", then the user's opinion about "raining days" is positive and some deep thinking related relaxing music can be recommended to the user during his/her driving.

Word ngrams: unigrams and bigrams for words in the query.

Character ngrams: For each word in the query, character ngrams are extracted. 4-grams and 5-grams are used in our system.

Word skip-grams: For all the trigrams and 4-grams in the query, one of the words is replaced by * to indicate the presence of non-contiguous words.

Brown cluster ngrams: Brown clusters are used to represent words (in the query), and extract unigrams and bigrams as features.

Part-of-speech (POS) tags: The presence or absence of part-of-speech tags are used as binary features.

Social network related words: number (in query) of hashtags, emoticons, elongated words, and punctuations are used as features.

Specially, when the user is sending queries through voice, then this part is not active. Otherwise, when the user is communicating with the chatbot through a touchable screen, then the hashtags or any related emotional symbols (other than natural language words) will be taken into account for "user's intention prediction".

Word2vec cluster ngrams: We use the word2vec tool (Mikolov et al., 2013) to learn 100-dimensional word embedding from a social network dataset. Then, a K-means algorithm and L2 distance of word vectors is used to cluster the million-level vocabulary into 200 classes. The classes are used to represent generalized words in the query.

Time spent (such as 3 seconds) when no one else answers current query, then the chatbot will answer the query in a proactive way.

Is the chatbot's name mentioned in the current user's query.

Is the query a question sentence that specially express a relatively strong intention from the user (the intention can be function, emotion and car related).

Multi-turn reasoning generation model 285 allows the chatbot to perform deep questioning and answering for news for example, and then switch to a new topic of news. The interface to the chatbot is function-oriented for satisfying a user's news receiving requirements. The following conversation between a user and the chatbot illustrates a deep questioning and answering (deepQA) for delivering news:

User: What's new today:

Chatbot: Texas elector quits, says pledge binding and president not qualified.
User: Who?
Chatbot: John Doe
User: How many electors are there in Texas?
Chatbot: 38 electors in Texas
User: How many faithless electors in American history?
Chatbot: There have been only 157 faithless electors in all of American history according to the nonprofit, FairVote, and none have affected a presidential race.
User: I see. Another one?
Chatbot: California targets dairy cows to combat global warming.

At the beginning of the above conversation, the user asks the chatbot about a general question about any recommendations of News. Then, the chatbot selected one News based on the user's interest topic list and the popular rate of that topic. The title of the selected News may be sent to the user as text, voice, video, or any combination thereof as may be selected by the user. The chatbot will continue to accept requests from the user. In case that the request is a specific question to that News, the chatbot may utilize a knowledge-based deep QA module to seek answers for user's specific question. Otherwise, if the request indicates an intent to switch to other news, then a different news response will be sent to the user.

Response generation should provide a fitting response to the current query. A fitting response should be grammatically correct and in the language used by the user. To produce natural sounding sentences a language model is trained. This language model can generate sentences by estimating one likely word at a time. Integrating each word's probability using a Greedy Search or Beam Search algorithm results in the probability of a response answer. The language model may be implemented on a client side or server side of the chatbot, or divided between the two with the client side providing an interface to the server portion of the language model. The language model may be quite large, making it more amenable to implementation on a server, such as cloud based computing resources.

Recurrent Neural Networks (RNNs) such as Gated Recurrent Unit (GRU) make efficient language models as they can incorporate distance relations between words in a sentence. The sentences should incorporate contextual information to be meaningful. This information can be incorporated through an attention mechanism that weights the available information and integrates it into a single vector for each RNN step. Many text generation models use a shallow single-turn attention mechanism which computes the attention vector as a weighted sum in a single operation.

Intuitively, the dialog model is trained to approximate the following function:

$$p(y_t|y_{<t},q,c),$$

P is the probability
where $y_t$ is the next word to be output, $y_{<t}$ the previously outputted words, q the query and c the context (specially, the context here can be a document that is pre-uploaded by the user or a textual description of a product). The different previously outputted words can be infinitely long pieces of text. If the search space is too big, the problem is intractable. To palliate this problem, the previously outputted words need to be compressed to some constrained vector representation. The part of the network that deals with this compression step is called "encoder".

Figure 7:
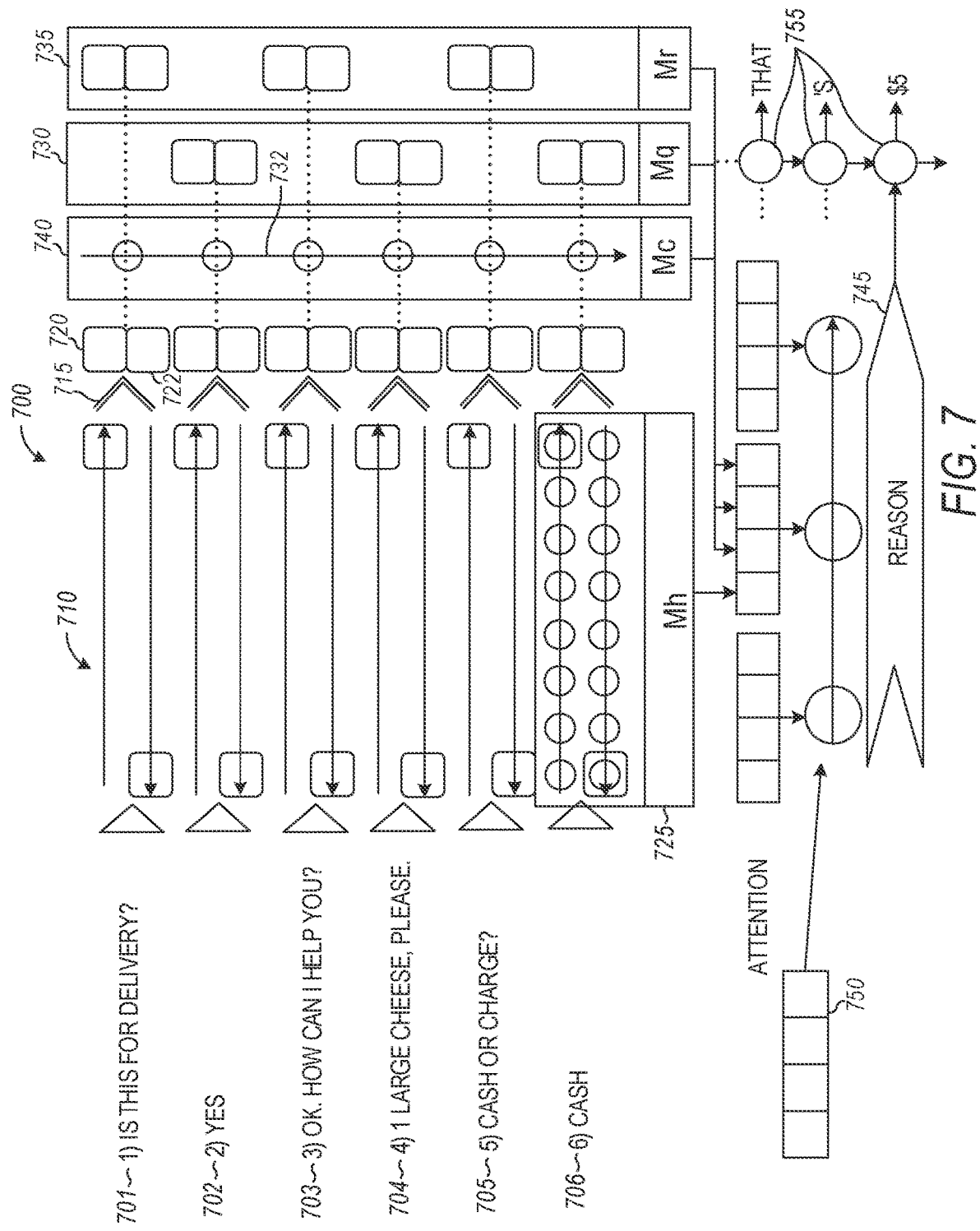
FIG. 7 is a block diagram of an example architecture of a multi-turn reasoning generation model according to an example embodiment.

FIG. 7 is a block diagram of an example architecture 700 of the multi-turn reasoning generation model 285. Architecture 700 also provides an overview of the process for one query-response iteration, showing text of six context sentences of the example chatbot queries at 701, 703, and 705 and example responses by the user at 702, 704, and 706. The queries and responses are one simple example of a multi-reasoning based exchange between a user and a chatbot with the user ordering a pizza. The conversation illustrated picks up after the user has expressed a desire for a pizza, and include the chatbot asking "is this for delivery"; user: yes; chatbot: Ok, how can I help you?; user: one large cheese please; chatbot: cash or charge?; user: cash.

The six context sentences are encoded independently by a recurrent neural network (RNN) 710 and embedded at 715 into two vectors indicated at 720 and 722 for context sentence 701. Note that each such context sentence is embedded into two vectors that do not have reference numbers for ease of illustration. The set of all the annotations from the sixth sentence 706 are stored in an $M_h$ memory 725. The annotations are representations of the string of sentences in floating point numbers in the vectors. The memory, $M_i$, for all i from each six sentences in the context, $M_i$, in which i takes the values of from 1 to 6, corresponding to the sentences, are distributed alternately in $M_q$ and $M_r$ memories indicated at 730 and 735 respectively. $M_q$ 730 stores query related vectors and $M_r$ 735 stores response vectors. The vectors are iterated sequentially by a different RNN represented by arrow 732, to produce the six $M_c$ annotations stored in memory $M_c$ 740. The circles in M 740 represent annotations of each sentence, forming a context vector which represents a memory of the conversation.

A reasoning module 745 receives output 750 from the user intention prediction model 275 and the stored annotations to generate events indicated at 755 that server as a response, in this case, "that's five dollars". The query vectors and the produced response vectors are further added to the context memory $M_c$ 740.

Figure 8:
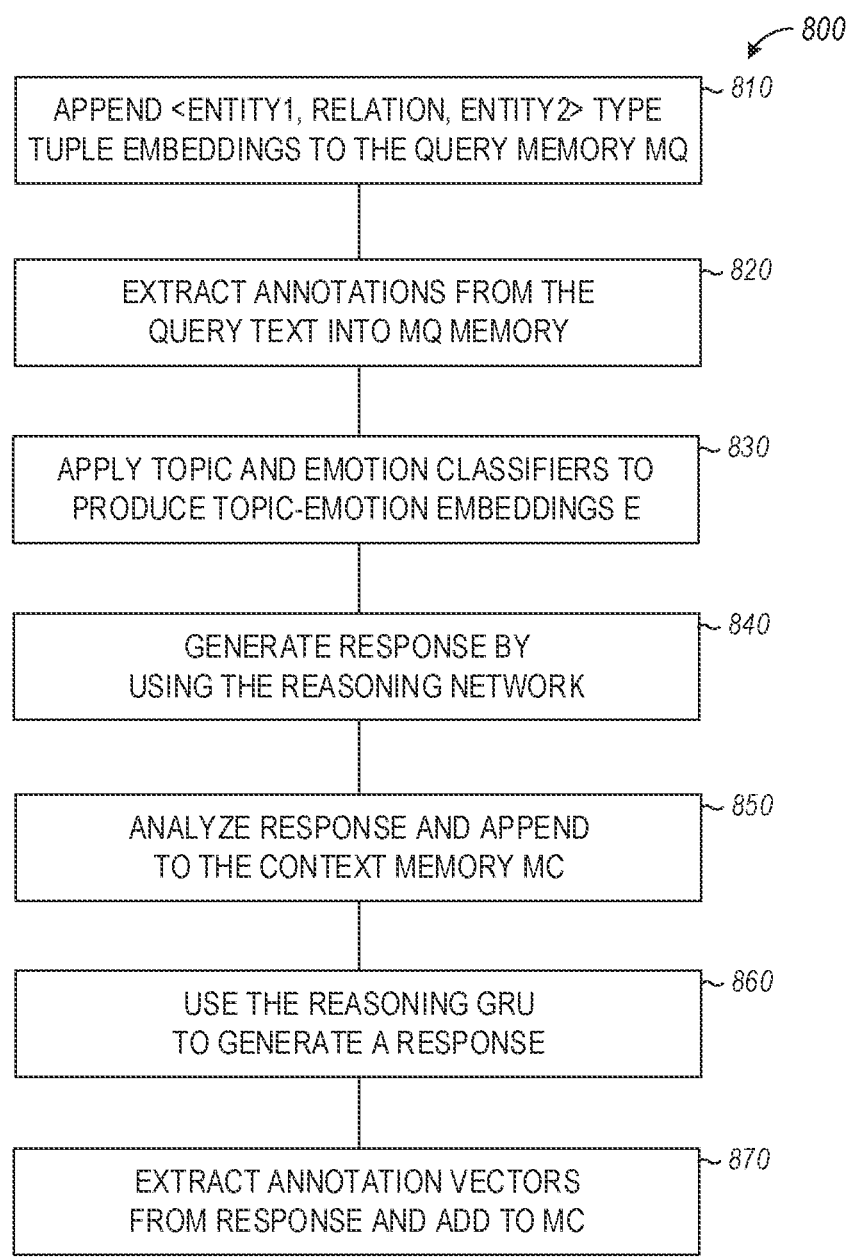
FIG. 8 is a flowchart showing operations for implementing a method implemented by a chatbot to participate in an example conversation according to an example embodiment.

FIG. 8 is a flowchart showing operations for implementing a method 800 implemented by the chatbot to participate in the above conversation outlined in the description of architecture 700. In particular, method 800 illustrates how the data stored in the various memories are obtained.

Method 800 begins by analyzing query vectors to extract entities applying a Named Entity Recognition (NER) software. Operation 810 is executed to Append <entity1, relation, entity2> type tuple embeddings to the query memory $M_q$. At operation 820, annotations are extracted from the query text into $M_q$ memory. Topic and emotion classifiers are applied at operation 830 to produce topic-emotion embeddings designated as e. In other words, emotional vectors are appended to all the existing vectors, such the vectors stored in $M_c$, $M_h$, $M_q$, and $M_r$. The response is generated by operation 840 by using the reasoning network 745.

At operation 850, the response is analyzed and appended to the context memory $M_c$ 740. Operation 860 uses a reasoning gated-recurrent unit (GRU) to generate the response 755, working together with operation 840 for reasoning based response generating, taking $M_c$, $M_q$, $M_r$, and $M_h$ as inputs. Annotation vectors from the response are extracted at operation 870 and added to memory $M_c$ 740.

Figure 9:
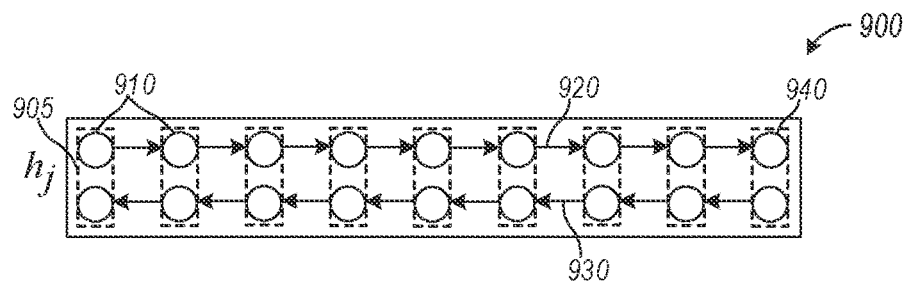
FIG. 9 is a representation of a bidirectional recurrent neural network (BiRNN) for encoding natural language text according to an example embodiment.

FIG. 9 is a representation of a bidirectional recurrent neural network (BiRNN) 900 for encoding natural language text, such as contextual information and queries. The received text is converted to numeric representations to be handled by programmed machines. The conversion in one embodiment can be achieved by representing each word as a continuous vector $h_j$. The best representation for each word, represented by circles 910, can be learned by the neural network 900.

A sentence can contain multiple pieces of information. Each single piece of information can be represented by a vector that is extracted via a recurrent Neural Network (RNN) 900 as illustrated. Each cell 905 of the 8 cell RNN 900 has its own representation of the vectors. All such vectors extracted from previous messages can be collected into a "Context Matrix". A "Query Matrix" can be compiled in a similar fashion from the query text.

The RNN can iterate the word vectors in either direction or both, which is called Bidirectional RNN (BiRNN). The right direction in FIG. 9 is shown at 920, with the left direction shown at 930. When using BiRNN, the vectors computed by each direction are concatenated into a new vector 940. One example query that may be processed by RNN 900 is: e=(What was the score of the Manchester game today?)

An RNN cell 905 can be Long-Short-Time-Memory (LSTM), (GRU) or any other. The behavior of GRU cells 905 is described. The input is a sequence of sentences where each sentence is ended with "<\s>" to annotate the ending of one sentence. If all the context sentences connected have T words from $W_1$ to $W_T$, the input session is encoded using the bi-directional GRU encoder. For eight cells, the left-to-right (l2r) direction or the right-to-left (r2l) direction, at each time step t, the network updates its hidden state $h_t$=GRU(L[$w_t$], $h_{t-1}$), where L is the embedding matrix and $w_t$ is the word index of the t-th word of the input sequence. Thus, the result representation vector for the input sequence at each "</s>" is a combination of two vectors and each is from one direction. The internal mechanics of the GRU is defined by equations of (1) to (4):

$$z_t = \sigma(W^{(z)}x_t + U^{(z)}h_{t-1} + b^{(z)}) \quad (1)$$

$$r_t = \sigma(W^{(r)}x_t + U^{(r)}h_{t-1} + b^{(r)}) \quad (2)$$

$$\tilde{h}_t = \tanh(Wx_t + r_t \circ Uh_{t-1} + b^{(h)}) \quad (3)$$

$$h_t = z_t \circ h_{t-1} + (1 - z_t) \circ \tilde{h}_t \quad (4)$$

where $\circ$ is an element-wise product, $W^{(z)}$, $W^{(r)}$, $W \in R^{n_H \times n_I}$ and $U^{(z)}$, $U^{(r)}$, $U \in R^{n_H \times n_H}$. The dimensions $n_H$ and $n_I$ are hyper parameters. The above computation may be abbreviated with $h_t$=GRU($x_t$, $h_{t-1}$). Specially, $n_H$ and $n_I$ here stand for the dimension of the hidden layer and input layer, respectively.

Besides the encoding of word sequences, we also use positional encoding with bidirectional GRUs to represent the "facts" of input sentences. That is, $f_t$=GRU$_{l2r}$(L[$S_t$], $f_{t-1}$)+GRU$_{r2l}$(L[$S_t$], $f_{t-1}$), where $S_t$ is the embedding expression of current sentence t and $f_{t-1}$, $f_t$ are the facts of former sentence and current sentence.

Figure 10:
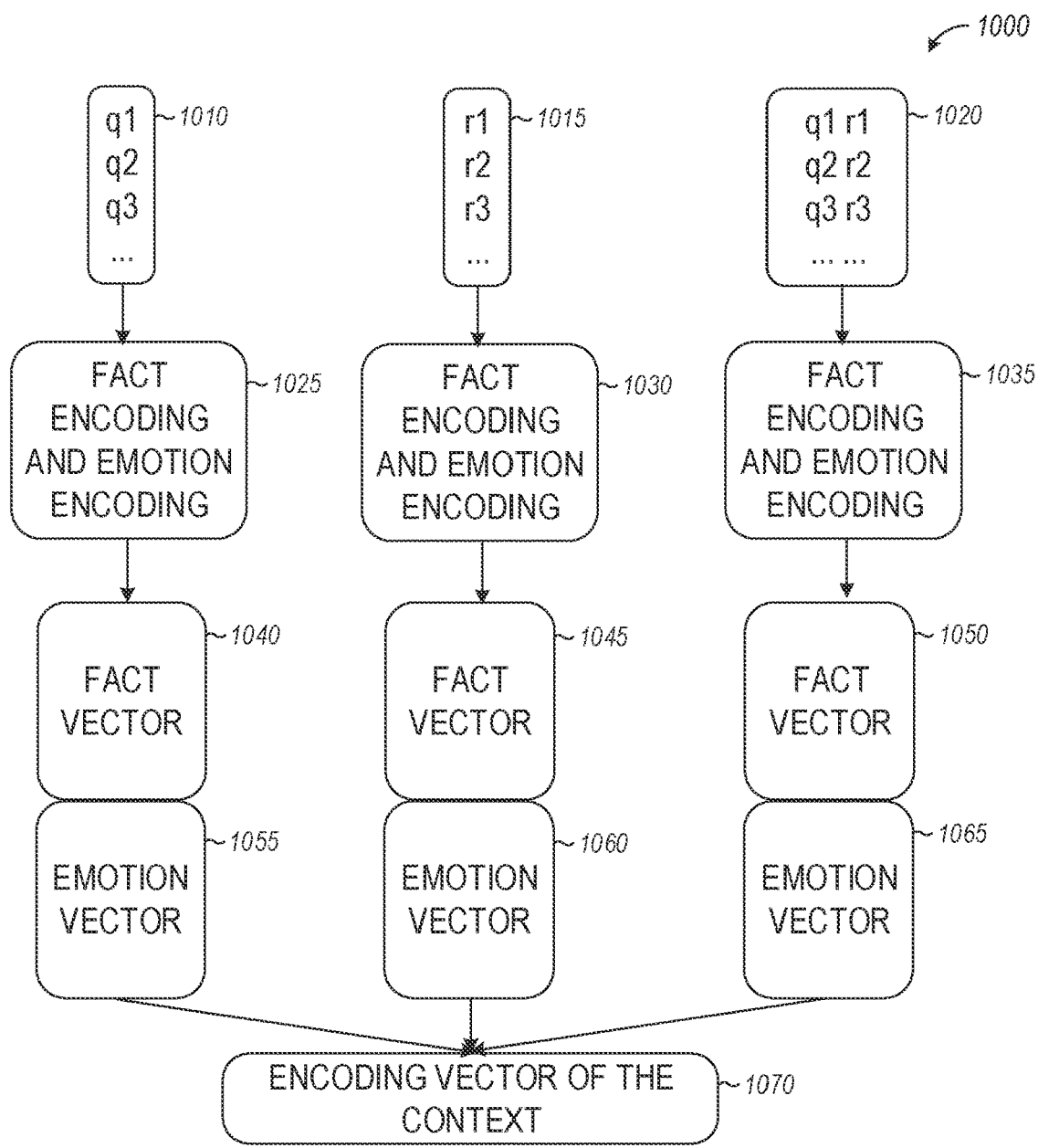
FIG. 10 is a block flow diagram representing encoding of context information according to an example embodiment.

FIG. 10 is a block flow diagram representing encoding of context information in the case of taking the historical <query, response> pairs as the "context" generally at 1000. Contextual information in the case of taking the historical conversation log, i.e., <query, response> pairs as the "context" is encoded. The context is separated into three types of vectors, the query part 1010, the response part 1015, and their combination part 1020. Each part is then fact and emotion encoded respectively at 1025, 1030, and 1035 into two types of vectors, fact vector 1040, 1045, 1050 and emotion vector 1055, 1060, 1065 respectively as shown. All these vectors are connected together to be used as the final context vector 1070, which are further used in FIG. 7 for multiple turn learning.

Figure 11:
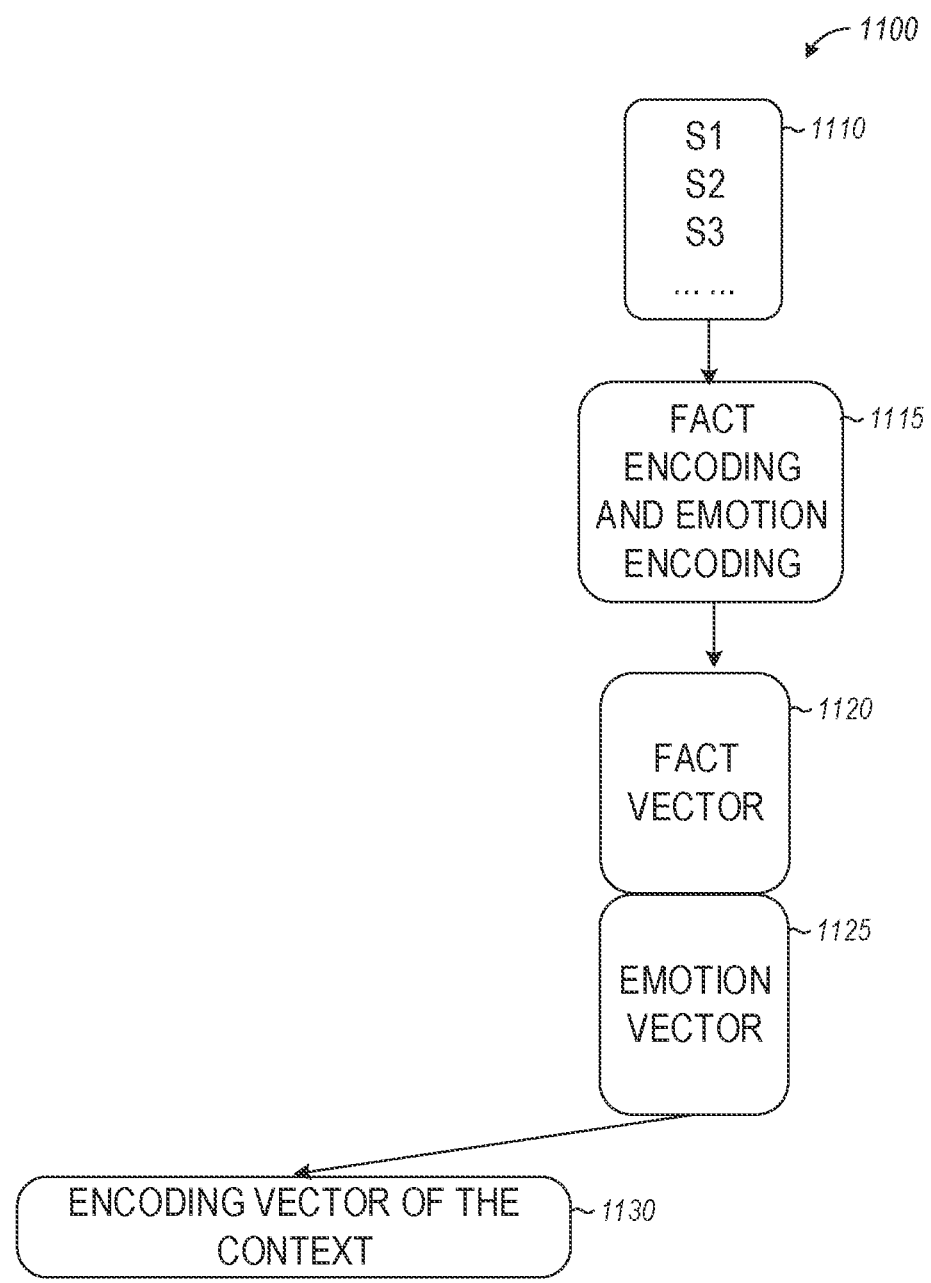
FIG. 11 is a simplified block flow diagram representing encoding of a document as context information according to an example embodiment.

When the "context" is only a pre-uploaded document from the user side (or, from the partner company side, of textual descriptions of products), then the representation of encoding can be simplified as shown in FIG. 11 at 1100. Encoding of the "document"/context information in the case of taking a list of sentences S1, S2, etc., at 1110 as the "context". Similarly, the context is fact and emotion encoded at 1115 into a fact vector 1120 and an emotion vector 1125 and connected together to be used as the final context vector 1130.

Figure 12:
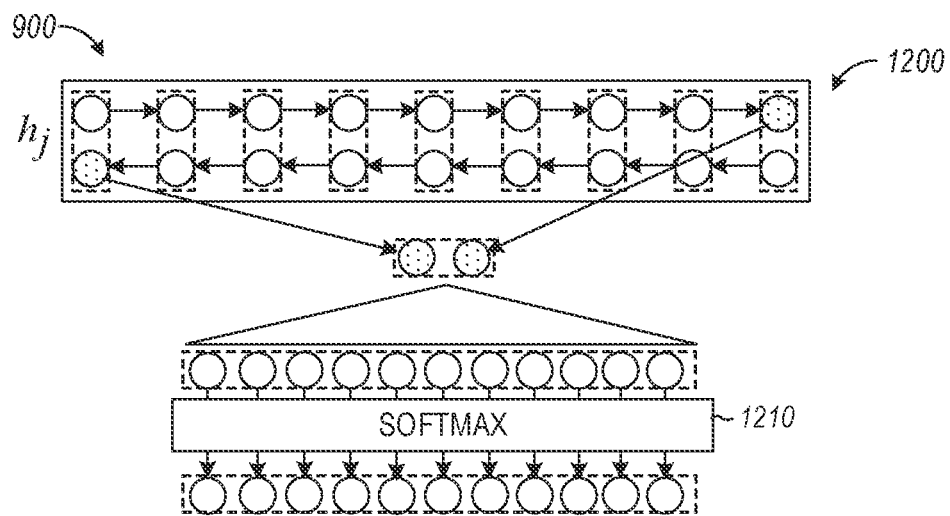
FIG. 12 is a block diagram of a BiRNN integrating emotion, topic, and participant embeddings according to an example embodiment.

In one embodiment, emotion, topic and participant embeddings are integrated into the reasoning module 745 to make it empathetic. An emotion classifier 1200 as shown in FIG. 12 is trained by applying a SoftMax layer 1210 on the last annotations of the left-to-right and right-to-left RNNs forming a BiRNN 1200. A softmax function is often used as part of the final layer of a neural network-based classifier to give a non-linear variant of multinomial logistic regression. A separate dataset may be used to train the classifier 1200.

A similar approach may be used for text topic classification. Combining both classifiers, <person, topic, emotion> style triplets may be collected from conversation data that can be integrated into the reasoning module 745. The triplets are integrated by projecting a concatenation of the topic embedding and the emotion embedding into a vector of the same size as the other vectors in the query and context memories.

A different option is to use an emotion classifier to label dialogue data and to train the emotion classifier jointly with the dialogue system using the same BiRNN.

Generating meaningful responses often utilizes external world knowledge. This information can be integrated by means of a knowledge base. When a query is made, the text is scanned for entity names and keywords and the results are searched in the knowledge base. The results are appended to the context memory to enhance the reasoning module with additional information. The external knowledge may be stored as <subject, relation, object> triplets. These triplets can be incorporated to the context by directly projecting the triplets into vectors using entity and relation embeddings, or verbalizing by using rules and appended the text to the query message.

Multi-turn reasoning is now described in further detail. The reasoning inference module 745 considers emotions on top of available information. To reach some conclusion, "multi-turn reasoning" is used. Multi-turn reasoning consists in going through multiple reasoning "turns" that infer new information that can be considered in the following (consequent, or next-step) reasoning turns to reach a meaningful state.

A standard attention mechanism may be replaced by a multi-turn reasoning attention. Each inference step applies an attention mechanism on the query-side vectors and on the context-side vectors. This attention mechanism sums the different pieces of information weighted by their attributed relevance. An RNN is updated with respect to the concatenation of these attention vectors.

The cells for the reasoning RNN can be GRU. For each reasoning step a "termination gate" estimates the probability for the reasoning to stop. When a value of "1.0" is reached by the termination gate the reasoning mechanism stops and outputs its last state. During training, the number of reasoning iterations is fixed to a maximum number and the outputs of the termination gate weight the different states of the RNN which are then summed to form the output vector of the reasoning mechanism.

As a formal description, given the set of context vectors $M_c$ and the set of query vectors $M_q$, the reasoning network should produce one context vector r that compresses the information. This r vector is computed as follows:

1) Initialize the state of the reasoning network to a learnt initial value and the step τ to be one:
   τ=1
   $s_1 = \theta_{initial}$
2) Initialize probability of termination $t_\tau$ to zero:
   $t_\tau = 0$
3) For each $M_u \in (M_q, M_c)$, compute one attention $c_u^{(\tau)}$:

$$c_u^\tau = \sum_{k=1}^n \alpha_u^{(\tau,k)} h_u^{(k)}, \quad \alpha_u^{\tau,k} = \frac{\exp(e_u^{(\tau,k)})}{\sum_{j=1}^n \exp(e_u^{(\tau,j)})}, \quad e_u^{\tau,k} = v_r^T \tanh(W_r s_{\tau-1} + U_r h_k).$$

4) Concatenate both attention vectors into one $c^{(\tau)}$.
5) Compute the new state $s_\tau$ by applying GRU as described in equations (1-4).

$$s_\tau = GRU(h_{t-1} = S_{\tau-1}, x = c_\tau, \theta_r)$$

The parameters $\theta_r = \{W, U, b\}$ are specific to the reasoning system.
6) Update the termination probability:

$$t_{\tau+1} = (1 - t_\tau)\sigma(W_r S_\tau),$$

where σ is the sigmoid function.

If the termination probability is above threshold 1−∈ or τ is bigger than a maximum iteration hyperparameter $T_{max}$, stop.

Otherwise, update τ=τ+1 and repeat from step (3)

The system may be trained in different steps. Emotion and topic classifiers may be pre-trained using annotated datasets. The dialog system that generates responses may be trained on a dialogue dataset.

Three types of training data may be used in one embodiment. In a first type of training data, pure chat, with <question, answer> pairs such as, <how are you today?, very good and how about you?> may be used. A second type of training data include function driven chat, such as <can you tell me the weather of Tokyo?, sure, it is sunny and will be cloudy at afternoon>. The third type of training data may be car related data, such as <can you help me open the window?, sure, I will open the front two windows, is that okay?>

Making use of these three types of training data, the reasoning model 745 may be independently trained. After that, the user intention prediction model 275 in the core worker 210 is used to switch from one scenario to another.

In one embodiment, a training algorithm minimizes negative log-likelihood (NLL) per character on the nine sentences of each conversation. One configuration in the reasoning model 745 respectively uses the reference contexts (instead of former automatically generated sentences) to generate a current sentence. That is, when generating $s_i$, the golden contextual sentences of from $s_1$ to $s_{i-1}$ are used.

To produce an operable chatbot that takes emotional intent into consideration in generating responses and performing multi-turn reasoning, Three systems were respectively trained 3 epochs (10,000 iterations) on an AdaDelta (zeiler_adadelta:_2012) optimizer. Character and word embedding matrix was shared by both the encoder and the decoder parts. All the hidden layers, in the encoding/decoding parts and the attention models, were of size 200 and the character embeddings were of size 100. The recurrent units used were GRU. The gradients were clipped at the maximum gradient norm of 1. The reasoning module's maximum steps $T_{max}$ was set to be 5. The data was iterated on mini-batches of less than 1,500 symbols each.

Recurrent weight matrices in GRUs were initialized as random orthogonal matrices. Unless specially mentioned, all the elements of the 0-indexed vectors and all bias vectors were initialized to be zero. Any other weight matrices were initialized by sampling from the Gaussian distribution of mean 0 and variance 0.01.

Figure 13:
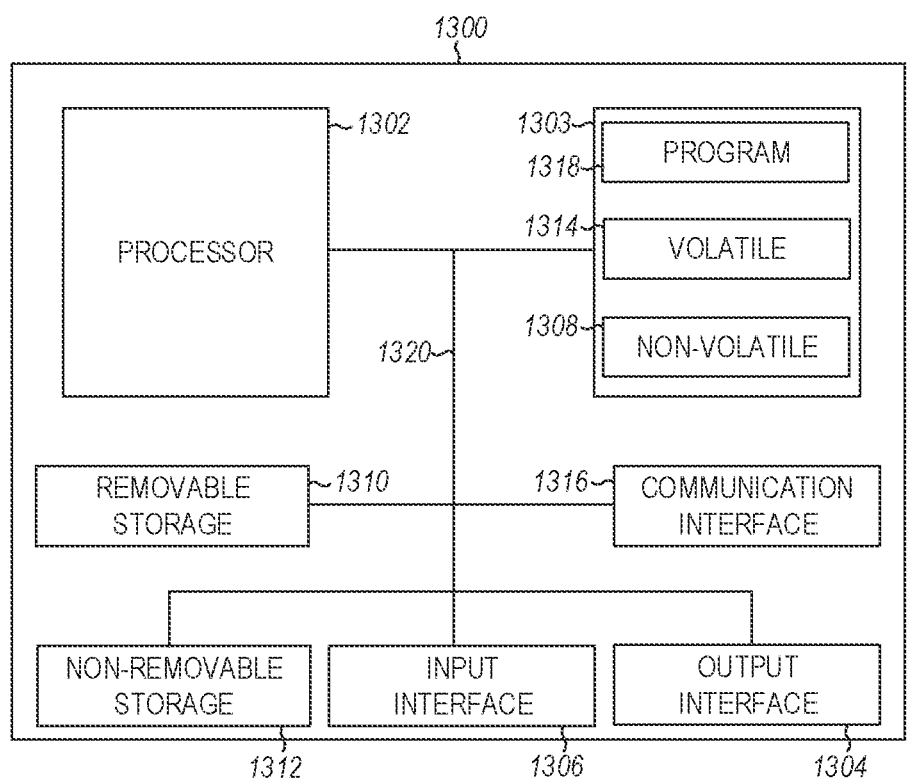
FIG. 13 illustrates a block diagram illustrating an example of a machine upon which one or more embodiments may be implemented.

FIG. 13 is a block diagram illustrating circuitry for a chatbot that takes a user's intent into account when generating responses performing other methods according to example embodiments. All components need not be used in various embodiments.

One example computing device in the form of a computer 1300 may include a processing unit 1302, memory 1303, removable storage 1310, and non-removable storage 1312. Although the example computing device is illustrated and described as computer 1300, the computing device may be in different forms in different embodiments. For example, the computing device may instead be a smartphone, a tablet, smartwatch, or other computing device including the same or similar elements as illustrated and described with regard to FIG. 13. Devices, such as smartphones, tablets, and smartwatches, are generally collectively referred to as mobile devices or user equipment. Further, although the various data storage elements are illustrated as part of the computer 1300, the storage may also or alternatively include cloud-based storage accessible via a network, such as the Internet or server based storage.

Memory 1303 may include volatile memory 1314 and non-volatile memory 1308. Computer 1300 may include, or have access to a computing environment that includes, a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1300 may include or have access to a computing environment that includes input interface 1306, output interface 1304, and a communication interface 1316. Output interface 1304 may include a display device, such as a touchscreen, that also may serve as an input device. The input interface 1306 may include one or more of a touchscreen, touchpad, mouse, keyboard, camera, one or more device-specific buttons, one or more sensors integrated within or coupled via wired or wireless data connections to the computer 1300, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1300 are connected with a system bus 1320.

Computer-readable instructions stored on a computer-readable medium are executable by the processing unit 1302 of the computer 1300, such as a program 1318. The program 1318 in some embodiments comprises software that, when executed by the processing unit 1302, performs operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1318 may be used to cause processing unit 1302 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

Other Notes and Examples

Example 1 is a method of providing information to a user as a function of derived user intent. The method includes receiving input from a user, generating an intent vector by processing the received input though an artificial intelligence model that has been trained with data representative of the user's intention, wherein the intent vector comprises a probability for each intent in a known set of possible intents, executing a trigger control model to determine whether to respond to the user as a function of the input from the user and the intent vector, utilizing the trigger control model, received input, and intent vector input to generate a response via a trained chatbot, and providing the response via an output device.

In Example 2, the subject matter of Example 1 optionally includes repeating the operations to perform multi-turn reasoning via the chatbot, wherein a first provided response is a bot query to the user, and a subsequent input from the user is a response to the bot query.

In Example 3, the subject matter of any of the previous example optionally includes wherein the intent vector comprises function oriented intentions of the user.

In Example 3, the subject matter of any of the previous examples optionally includes wherein the intent vector comprises emotion oriented intentions of the user.

In Example 5, the subject matter of any of the previous examples optionally includes wherein the intent vector comprises car-control oriented intentions of the user.

In Example 6, the subject matter of any of the previous examples optionally includes wherein providing the response comprises queuing multiple responses in an output queue and using the trigger control model to determine which response in the queue to provide via the output device.

In Example 7, the subject matter of any of the previous examples optionally includes wherein input from a user comprises input from multiple users, and wherein providing the response comprises correlating each response with each user, queuing multiple responses in an output queue, and using the trigger control model to determine which response in the queue to provide via the output device as a function of priority of the user corresponding to each queued response.

In Example 8, the subject matter of any of the previous examples optionally includes wherein the user input comprises at least one of text, audio, video, GPS, and car sensors.

In Example 9, the subject matter of any of the previous examples optionally includes wherein the user input comprises user profile data, including a gender of the user.

In Example 10, the subject matter of any of the previous examples optionally includes wherein the trigger control model comprises a logistic regression model that generates a probability that a response should be triggered, compares the probability to a probability threshold, and triggers the response as a function of the comparison of the probability to the probability threshold.

In Example 11, the subject matter of any of the previous examples optionally includes wherein the trigger control model generates the probability that a response should be triggered as a function of user input by multiple users and an engagement rate of the multiple users.

In Example 12, the subject matter of any of the previous examples optionally includes receiving sensor input data from multiple sensors in a vehicle, and wherein the chatbot generates the response as a function of the received sensor input data.

Example 13 is a system that includes a processor and a memory, the memory comprising instructions, which when executed by the processor, cause the processor to perform operations for providing information to a user as a function of derived user intent. The operations include receiving input from a user, generating an intent vector by processing the received input though an artificial intelligence model that has been trained with data representative of the user's intention, wherein the intent vector comprises a probability for each intent in a known set of possible intents, executing a trigger control model to determine whether to respond to the user as a function of the input from the user and the intent vector, utilizing the trigger control model, received input, and intent vector input to generate a response via a trained chatbot, and providing the response via an output device.

In Example 14, the subject matter of any of the previous examples optionally includes wherein the operations further comprise repeating the operations to perform multi-turn reasoning via the chatbot, wherein a first provided response is a bot query of the user, and a subsequent input from the user is a response to the bot query.

In Example 15, the subject matter of any of the previous examples optionally includes wherein the intent vector comprises at least one of function oriented intentions of the user, emotion oriented intentions of the user, and car-control oriented intentions of the user.

In Example 16, the subject matter of any of the previous examples optionally includes wherein providing the response comprises queuing multiple responses in an output queue and using the trigger control model to determine which response in the queue to provide via the output device.

In Example 17, the subject matter of any of the previous examples optionally includes wherein input from a user comprises input from multiple users, and wherein providing the response comprises correlating each response with each user, queuing multiple responses in an output queue, and using the trigger control model to determine which response in the queue to provide via the output device as a function of priority of the user corresponding to each queued response.

In Example 18, the subject matter of any of the previous examples optionally includes wherein the trigger control model comprises a logistic regression model that generates a probability that a response should be triggered, compares the probability to a probability threshold, and triggers the response as a function of the comparison of the probability to the probability threshold, and wherein the trigger control model generates the probability that a response should be triggered as a function of user input by multiple users and an engagement rate of the multiple users.

Example 19 is a machine readable medium having instructions, which when executed by a processor, cause the processor to perform operations for providing information to a user as a function of derived user intent. The operations include receiving input from a user, generating an intent vector by processing the received input though an artificial intelligence model that has been trained with data representative of the user's intention, wherein the intent vector comprises a probability for each intent in a known set of possible intents, executing a trigger control model to determine whether to respond to the user as a function of the input from the user and the intent vector, executing a trained chatbot responsive to the trigger control model, received input, and intent vector to generate a response, and providing the response via an output device.

In Example 20, the subject matter of any of the previous examples optionally includes wherein the operations further comprise repeating the operations to perform multi-turn reasoning via the chatbot, wherein a first provided response is a bot query of the user, and a subsequent input from the user is a response to the bot query.

In Example 21, the subject matter of any of the previous examples optionally includes wherein the intent vector comprises at least one of function oriented intentions of the user, emotion oriented intentions of the user, and car-control oriented intentions of the user and wherein input from a user comprises input from multiple users, and wherein providing the response comprises correlating each response with each user, queuing multiple responses in an output queue, and using the trigger control model to determine which response in the queue to provide via the output device as a function of priority of the user corresponding to each queued response.

The invention claimed is:

1. A method of providing information to a user as a function of derived user intent, the method comprising:
   receiving input from a user during a current conversation session;
   generating an intent vector by processing the received input and current conversation session through an artificial intelligence model that has been trained with data representative of the user's intention, wherein the intent vector comprises a probability for each intent in a known set of possible intents;
   executing a trigger control model to determine whether to respond to the user as a function of the input from the user, the intent vector, and the current conversation session;
   utilizing the trigger control model, received input, and intent vector input to generate a conversation response via a trained chatbot; and
   providing the conversation response via an output device, wherein the trigger control model generates a probability that a conversation response should be triggered, compares the probability to a probability threshold, and triggers the conversation response as a function of the comparison of the probability to the probability threshold, and wherein the trigger control model generates the probability that a conversation response should be triggered as a function of user input by multiple users and an engagement rate of the multiple users.

2. The method of claim 1 and further comprising repeating the operations to generate a response via the trained chatbot by performing multi-turn reasoning via the chatbot, wherein a first provided response is a bot query to the user, and a subsequent input from the user is a response to the bot query.

3. The method of claim 1 wherein the intent vector comprises function oriented intentions of the user.

4. The method of claim 1 wherein the intent vector comprises emotion oriented intentions of the user.

5. The method of claim 1 wherein the intent vector comprises car-control oriented intentions of the user.

6. The method of claim 1 wherein input from a user comprises input from multiple users involved in the current conversation session, and wherein providing the response comprises:
   queuing multiple conversation responses in an output queue;
   correlating each response with each user; and
   using the trigger control model to determine which conversation response in the queue to provide via the output device as a function of priority of the user corresponding to each queued conversation response.

7. The method of claim 1 wherein the user input comprises at least one of text, audio, video, GPS, and car sensors.

8. The method of claim 1 wherein the user input comprises user profile data, including a gender of the user.

9. The method of claim 1 wherein the trigger control model comprises a logistic regression model that generates the probability that a conversation response should be triggered, compares the probability to a probability threshold, and triggers the conversation response as a function of the comparison of the probability to the probability threshold.

10. The method of claim 1 and further comprising receiving sensor input data from multiple sensors in a vehicle, and wherein the chatbot generates the response as a function of the received sensor input data.

11. A system comprising:
    a processor; and
    a memory, the memory comprising instructions, which when executed by the processor, cause the processor to perform operations for providing information to a user as a function of derived user intent, the operations comprising:
    receiving input from a user during a current conversation session;
    generating an intent vector by processing the received input and current conversation session through an artificial intelligence model that has been trained with data representative of the user's intention, wherein the intent vector comprises a probability for each intent in a known set of possible intents;
    executing a trigger control model to determine whether to respond to the user as a function of the input from the user, the intent vector, and the current conversation session;
    utilizing the trigger control model, received input, and intent vector input to generate a conversation response via a trained chatbot; and
    providing the conversation response via an output device, wherein the trigger control model generates a probability that a conversation response should be triggered, compares the probability to a probability threshold, and triggers the conversation response as a function of the comparison of the probability to the probability threshold, and wherein the trigger control model generates the probability that a conversation response should be triggered as a function of user input by multiple users and an engagement rate of the multiple users.

12. The system of claim 11 wherein the operations further comprise repeating the operations to generate a response via the trained chatbot by performing multi-turn reasoning via the chatbot, wherein a first provided response is a bot query to the user, and a subsequent input from the user is a response to the bot query.

13. The system of claim 11 wherein the intent vector comprises at least one of function oriented intentions of the user, emotion oriented intentions of the user, and car-control oriented intentions of the user.

14. The system of claim 11 wherein providing the response comprises:
   queuing multiple conversation responses in an output queue; and
   using the trigger control model to determine which conversation response in the queue to provide via the output device.

15. The system of claim 11 wherein input from a user comprises input from multiple users involved in the current conversation session, and wherein providing the response comprises:
   queuing multiple conversation responses in an output queue;
   correlating each response with each user; and
   using the trigger control model to determine which conversation response in the queue to provide via the output device as a function of priority of the user corresponding to each queued conversation response.

16. The system of claim 11 wherein the trigger control model comprises a logistic regression model that generates the probability that a conversation response should be triggered, compares the probability to a probability threshold, and triggers the conversation response as a function of the comparison of the probability to the probability threshold.

17. A computer readable medium having instructions, which when executed by a processor, cause the processor to perform operations for providing information to a user as a function of derived user intent, the operations comprising:
   receiving input from a user during a current conversation session;
   generating an intent vector by processing the received input and current conversation session through an artificial intelligence model that has been trained with data representative of the user's intention, wherein the intent vector comprises a probability for each intent in a known set of possible intents;
   executing a trigger control model to determine whether to respond to the user as a function of the input from the user, the intent vector, and the current conversation session;
   utilizing the trigger control model, received input, and intent vector input to generate a conversation response via a trained chatbot; and
   providing the conversation response via an output device, wherein the trigger control model generates a probability that a conversation response should be triggered, compares the probability to a probability threshold, and triggers the conversation response as a function of the comparison of the probability to the probability threshold, and wherein the trigger control model generates the probability that a conversation response should be triggered as a function of user input by multiple users and an engagement rate of the multiple users.

18. The computer readable medium of claim 17 wherein the operations further comprise repeating the operations to generate a response via the trained chatbot by performing multi-turn reasoning via the chatbot, wherein a first provided response is a bot query to the user, and a subsequent input from the user is a response to the bot query.

19. The computer readable medium of claim 17 wherein the intent vector comprises at least one of function oriented intentions of the user, emotion oriented intentions of the user, and car-control oriented intentions of the user and wherein input from a user comprises input from multiple users involved in the current conversation session, and wherein providing the response comprises:
   queuing multiple conversation responses in an output queue;
   correlating each response with each user; and
   using the trigger control model to determine which conversation response in the queue to provide via the output device as a function of priority of the user corresponding to each queued conversation response.

* * * * *